(12) United States Patent
Chinn et al.

(10) Patent No.: US 9,545,346 B2
(45) Date of Patent: *Jan. 17, 2017

(54) MOUNTING DEVICE PROVIDING A PIVOTAL INTERFACE FOR ATTACHMENT OF EMERGENCY EQUIPMENT THERETO AND A METHOD THEREOF

(71) Applicant: Ferno-Washington, Inc., Wilmington, OH (US)

(72) Inventors: Robert C. Chinn, Cumming, GA (US); Joseph G. Bourgraf, Maineville, OH (US)

(73) Assignee: Ferno-Washington, Inc., Wilmington, OH (US)

( * ) Notice: Subject to any disclaimer, the term of this patent is extended or adjusted under 35 U.S.C. 154(b) by 74 days.

This patent is subject to a terminal disclaimer.

(21) Appl. No.: 14/156,816

(22) Filed: Jan. 16, 2014

(65) Prior Publication Data

US 2014/0124637 A1    May 8, 2014

Related U.S. Application Data

(63) Continuation of application No. 13/115,427, filed on May 25, 2011, now Pat. No. 8,661,583.

(60) Provisional application No. 61/348,310, filed on May 26, 2010.

(51) Int. Cl.
| | |
|---|---|
| *F16M 11/06* | (2006.01) |
| *A61G 3/08* | (2006.01) |
| *A61G 1/04* | (2006.01) |
| *A61G 1/052* | (2006.01) |
| *A61G 7/00* | (2006.01) |
| *F16M 13/02* | (2006.01) |
| *F16M 11/00* | (2006.01) |
| *F16M 11/10* | (2006.01) |

(52) U.S. Cl.
CPC ............... *A61G 3/0875* (2013.01); *A61G 1/04* (2013.01); *A61G 1/052* (2013.01); *A61G 7/00* (2013.01); *F16M 13/02* (2013.01); *A61G 2203/76* (2013.01); *A61G 2203/78* (2013.01); *A61G 2210/30* (2013.01); *F16M 11/00* (2013.01); *F16M 11/06* (2013.01); *F16M 11/10* (2013.01); *Y10T 29/49959* (2015.01)

(58) Field of Classification Search
USPC .......................... 248/220.21, 220.22, 222.11, 222.13,248/222.52, 923, 292.13, 292.11, 133, 134, 139,248/140, 142, 371, 316.1, 689, 223.41, 224.51,248/224.7, 225.11, 309.1, 682; 5/625–627, 5/503.1; 361/679.3, 679.29, 679.56; 403/345, 403/358, 361, 363, 381
See application file for complete search history.

(56) References Cited

U.S. PATENT DOCUMENTS

| | | |
|---|---|---|
| 4,547,092 A | 10/1985 | Vetter et al. |
| 4,799,290 A * | 1/1989 | Lautenschlager, Jr. ......................... E05D 7/0407 16/237 |
| 6,446,285 B1 | 9/2002 | Chinn |

(Continued)

*Primary Examiner* — Alfred J Wujciak
(74) *Attorney, Agent, or Firm* — Dinsmore & Shohl LLP

(57) ABSTRACT

A mounting device which provides a pivotal interface for emergency equipment and a method of attaching the emergency equipment to a rescue transport, e.g., a foot of a litter, are disclosed. For example, the mounting device is releasably attachable to the litter and includes a fastening device operably attached to a mounting structure of the device. The mounting structure includes a tilt plate capable of pivoting. The mounting device also includes an adapter capable of securely mating with the tilt plate, providing a pivotal interface for the attachment of the emergency equipment thereto.

20 Claims, 17 Drawing Sheets

(56) References Cited

U.S. PATENT DOCUMENTS

| | | | |
|---|---|---|---|
| 6,478,275 B1 | 11/2002 | Huang | |
| 6,493,890 B2 | 12/2002 | Smeed | |
| 6,935,601 B2 * | 8/2005 | Tanaka | 248/294.1 |
| 7,506,850 B2 * | 3/2009 | Chang | 248/221.11 |
| 7,523,514 B2 | 4/2009 | Salt et al. | |
| 8,282,058 B2 | 10/2012 | Lundrigan et al. | |
| 8,596,595 B2 * | 12/2013 | DeVito | 248/220.31 |
| 8,661,583 B2 * | 3/2014 | Chinn et al. | 5/503.1 |
| 2002/0180661 A1 | 12/2002 | An | |
| 2003/0230687 A1 | 12/2003 | Metz et al. | |
| 2004/0006846 A1 * | 1/2004 | Rupprechter | E05D 7/0415 16/235 |
| 2006/0278789 A1 * | 12/2006 | Jopling | 248/309.1 |
| 2007/0267556 A1 | 11/2007 | Herskovic | |
| 2009/0032668 A1 * | 2/2009 | Lin et al. | 248/371 |
| 2009/0173855 A1 | 7/2009 | Worrall | |
| 2011/0006646 A1 | 1/2011 | Kallurwar et al. | |
| 2015/0137760 A1 * | 5/2015 | Yang | G06F 1/16 |

\* cited by examiner

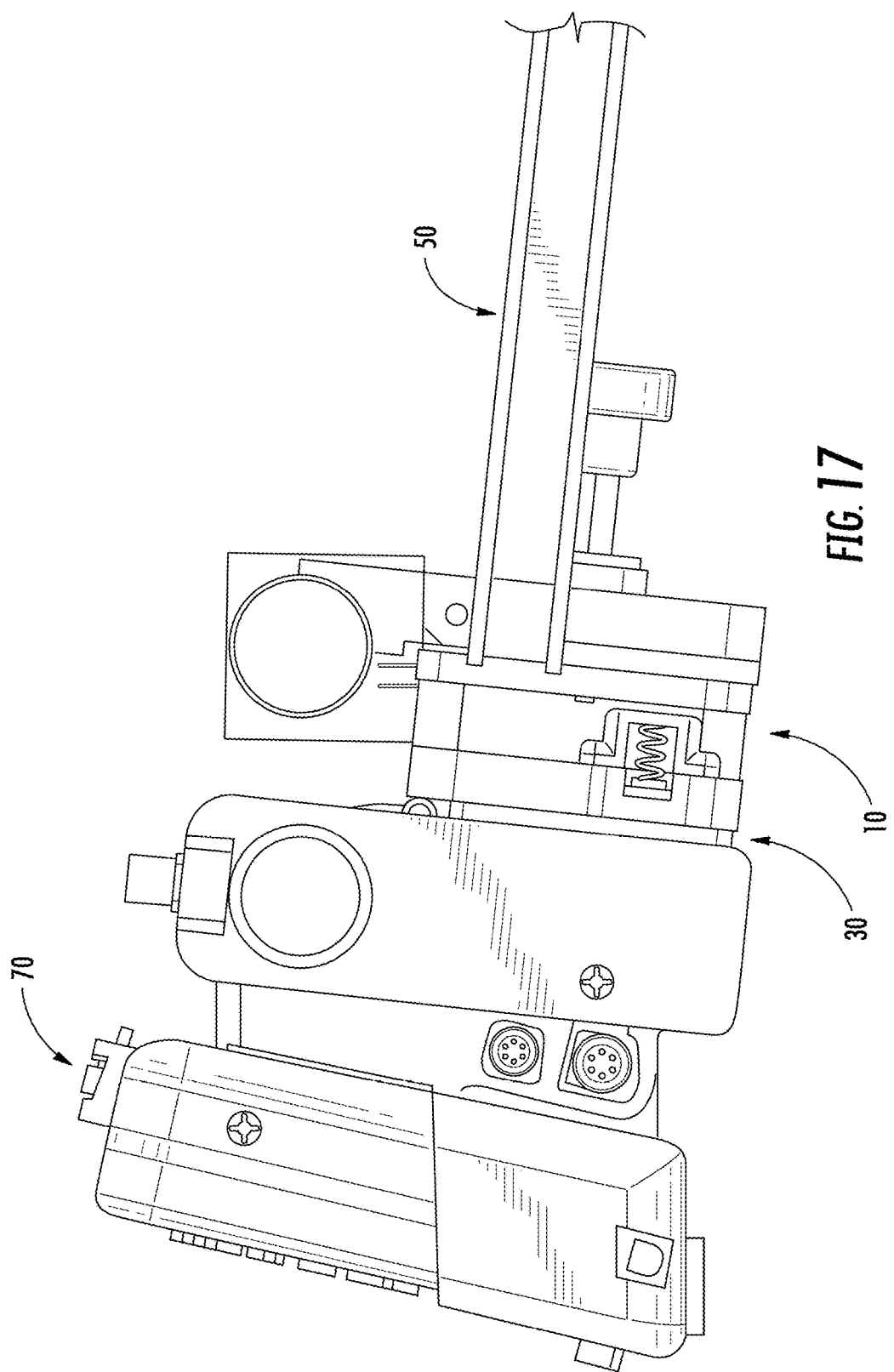

MOUNTING DEVICE PROVIDING A PIVOTAL INTERFACE FOR ATTACHMENT OF EMERGENCY EQUIPMENT THERETO AND A METHOD THEREOF

CROSS-REFERENCE TO RELATED APPLICATIONS

This application is filed under 35 U.S.C. §111(a) as a continuation of U.S. application Ser. No. 13/115,427, filed on May 25, 2011, which claims the benefit of U.S. Provisional Application Ser. No. 61/348,310, filed on May 26, 2010, the contents of which are hereby incorporated by reference in their entirety.

TECHNICAL FIELD

The present disclosure relates generally to mounting devices, and more particularly relates to mounting devices for litters, wherein the mounting devices provide a pivotal interface for the attachment of emergency equipment thereto.

BACKGROUND

The use of litters in transporting injured patients is widespread. The ability to monitor a patient's medical status with emergency equipment during transport is critical. However, litters currently employed in patient transport have a fairly basic structure to which emergency equipment is not easily attached. While various modifications to litters have been attempted to allow attachment of emergency equipment, these modifications limit the ability of litters to be stacked. Thus, additional embodiments are needed.

SUMMARY

Embodiments of the present invention relate to a mounting device which provides a pivotal interface for emergency equipment. The mounting device is releasably attachable to a litter and includes a fastening device operably attached to a mounting structure. The mounting structure includes a tilt plate, a litter engaging plate and a pivoting mechanism. The tilt plate is attached to the litter engaging plate with a pivoting mechanism, such that the tilt plate may pivot about its attachment to the litter engaging plate. The mounting device also includes an adapter capable of securely mating with the tilt plate of the mounting structure, providing a pivotal interface for the attachment of emergency equipment thereto.

In another embodiment, a method of utilizing a mounting device according to an embodiment of the present invention to releasably attach emergency equipment to a litter is also disclosed.

These and other features and advantages of these and other various embodiments according to the present invention will become more apparent in view of the drawings, detailed description, and claims provided that follow hereafter.

BRIEF DESCRIPTION OF THE DRAWINGS

The following detailed description of the embodiments of the present invention can be best understood when read in conjunction with the following drawings, where like structure is indicated with like reference numerals, and in which:

FIG. 17 is a side view of the emergency equipment releasably attached to the adapter depicted in FIG. 13, wherein the adapter is securely mated with the mounting device according to an embodiment of the present invention.

Skilled artisans appreciate that elements in the figures are illustrated for simplicity and clarity and have not necessarily been drawn to scale. For example, the dimensions of some of the elements in the figures may be exaggerated relative to other elements, as well as conventional parts removed, to help to improve understanding of the various embodiments of the present invention.

DETAILED DESCRIPTION

Embodiments of the present invention relate to a mounting device which provides a pivotal interface for attaching emergency equipment thereto and to a method of attaching releasably and tiltably such equipment to a rescue transport, such as for example a litter, a cot, an emergency vehicle, and the likes. In the forgoing illustrated embodiments, the mounting device is depicted as being releasably attachable to a litter for convenience and includes a fastening device operably attached to a mounting structure of the device. The mounting structure includes a tilt plate, a litter engaging plate and a pivoting mechanism. The tilt plate is attached to the litter engaging plate with a pivoting mechanism, such that the tilt plate may pivot about its attachment to the litter engaging plate. The mounting device also includes an adapter capable of securely mating with the tilt plate of the mounting structure, providing a pivotal interface for the attachment of emergency equipment thereto. It is to be appreciated the fastening device and the mounting structure of the device may be so configured to attach to other such rescue transports besides litters in any one of the manners described herein.

Figure 1:
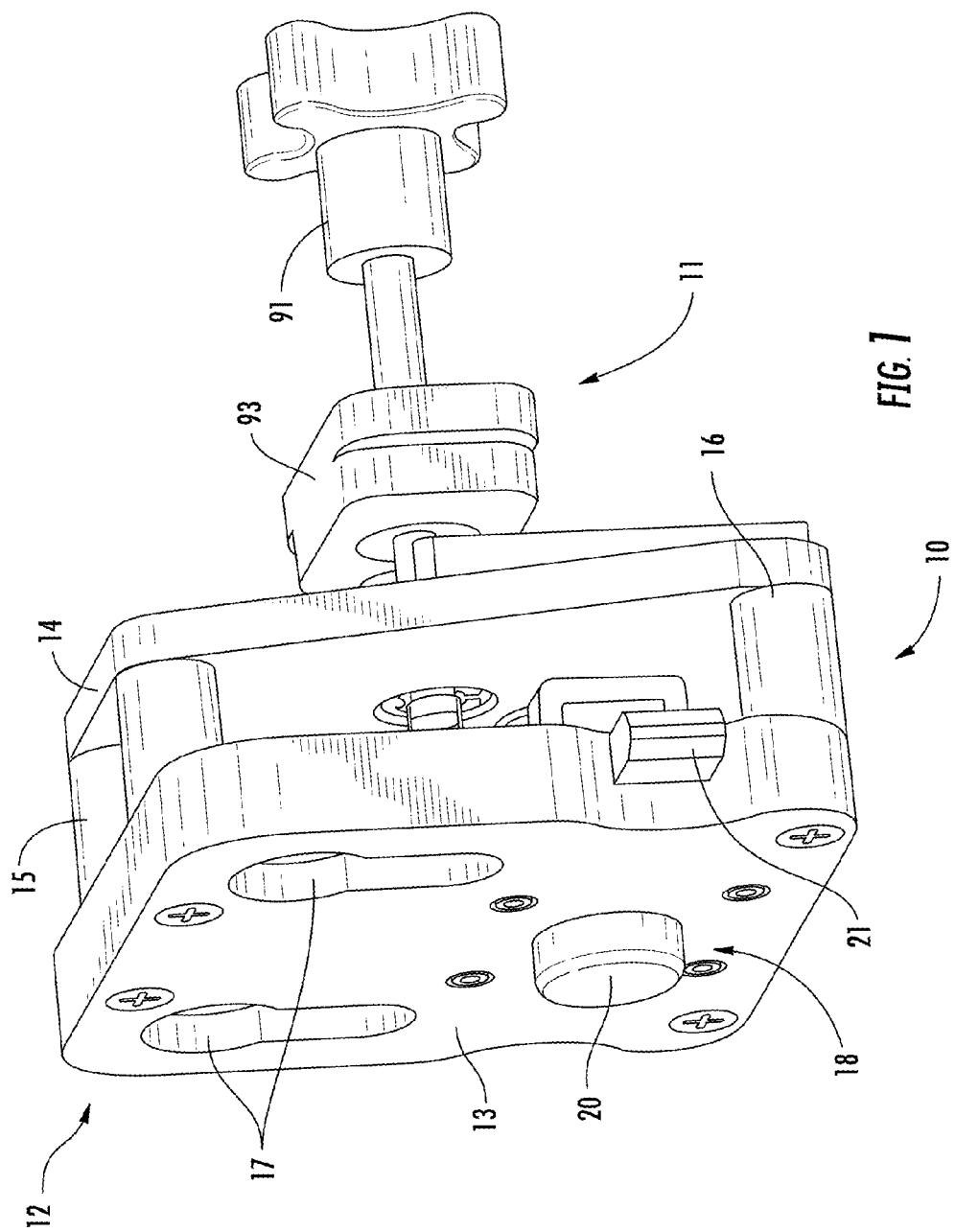
FIG. 1 is a side perspective view of a mounting device according to an embodiment of the present invention.
Figure 2:
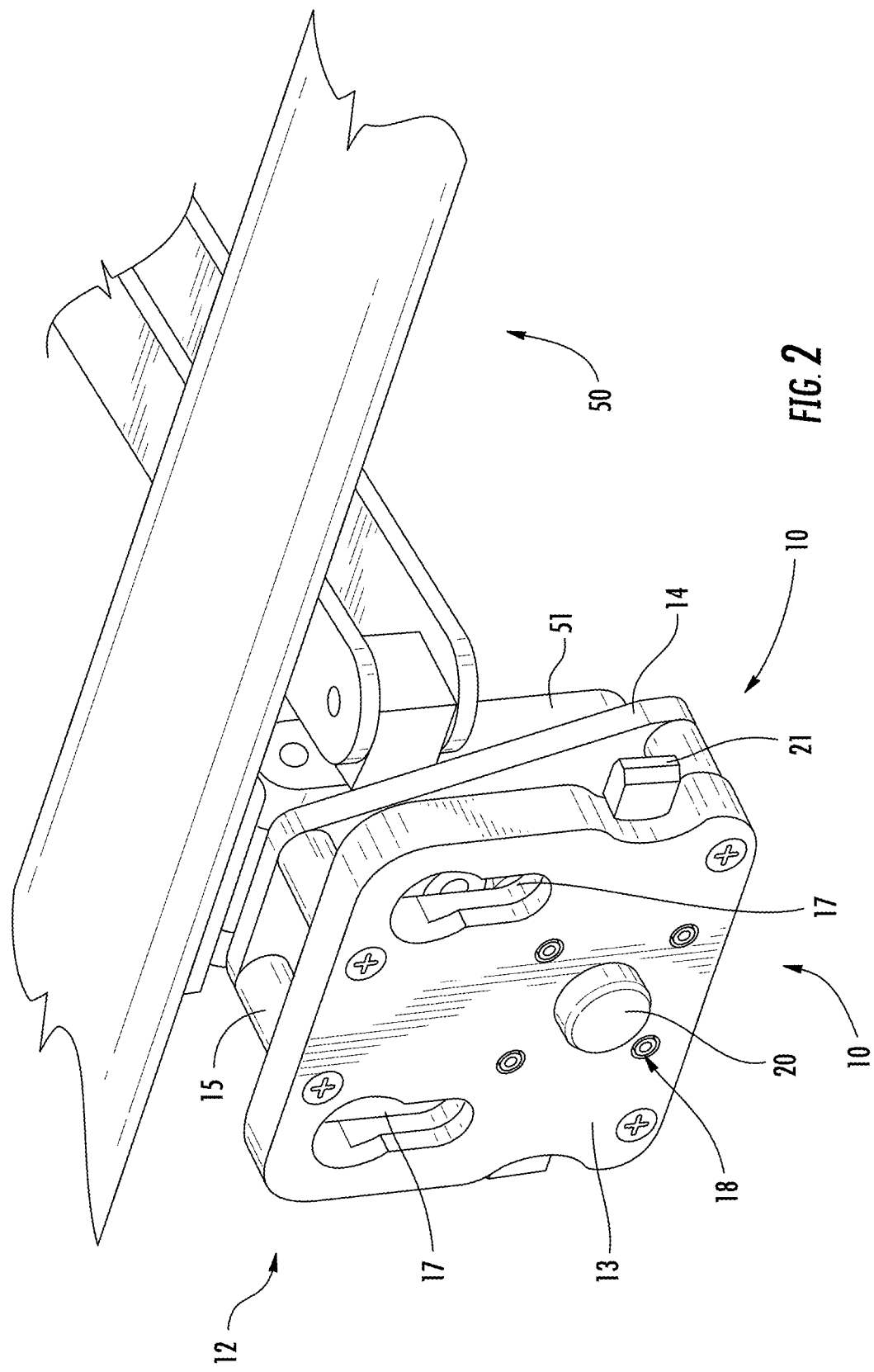
FIG. 2 is a front perspective view of a mounting device releasably attached to a litter according to an embodiment of the present invention.
Figure 5:
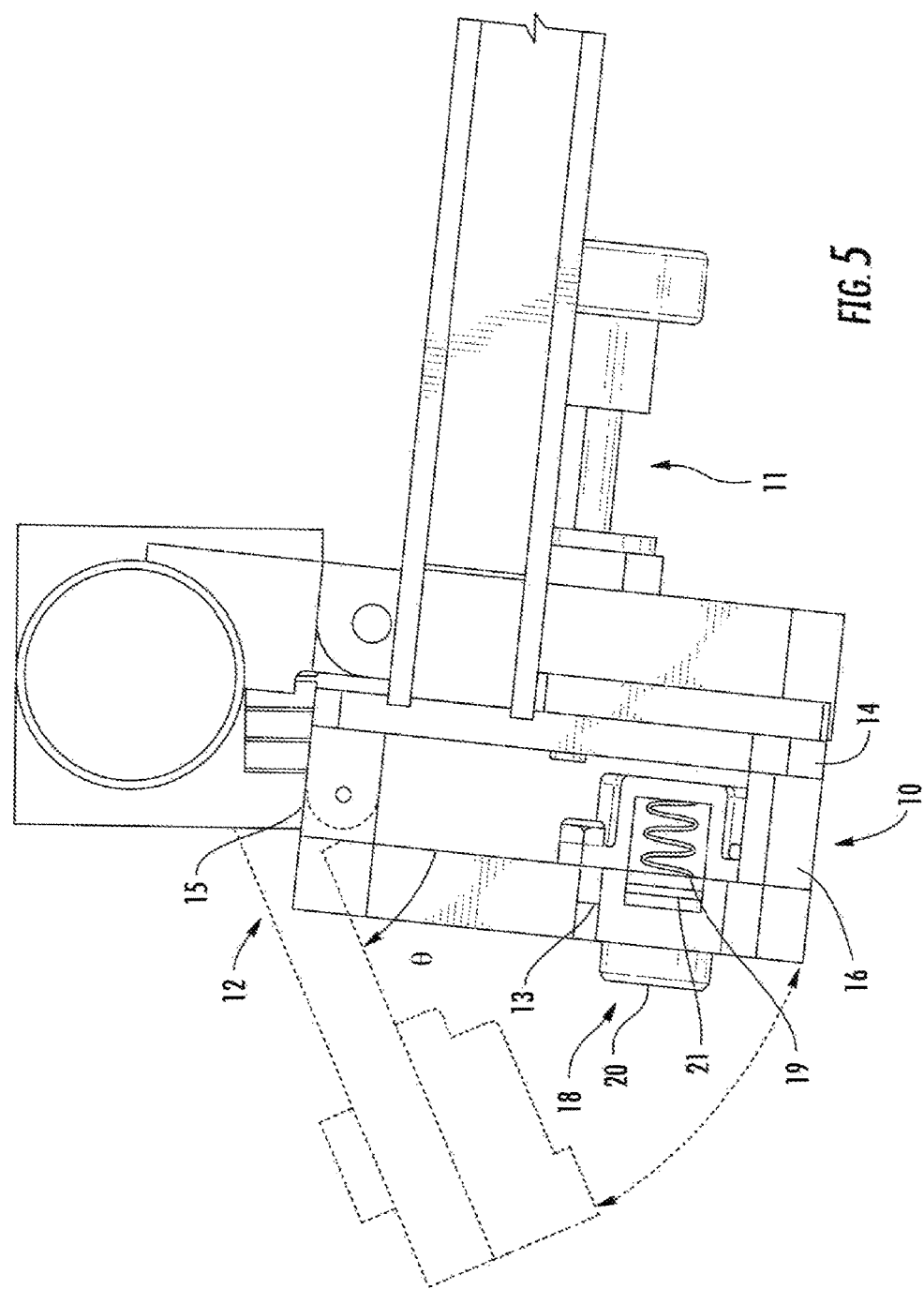
FIG. 5 is a side view of the mounting device releasably attached to the litter according to an embodiment of the present invention.

Referring to FIGS. 1 and 2, the mounting device 10 is releasably attachable to a rescue transport, which is shown as litter 50. The mounting device 10 comprises a fastening device 11 and a mounting structure 12. The fastening device 11 is operably connected to the mounting structure 12, such that when the fastening device 11 is engaged, the mounting structure 12 translates laterally, so that it may engage the litter 50. The mounting structure 12 comprises a tilt plate 13, a litter engaging plate 14, a pivoting mechanism 15, and a stopper member 16. In this particular embodiment, the tilt plate 13 and the litter engaging plate 14 are attached to the pivoting mechanism 15, such that the tilt plate 13 may pivot about its attachment to the litter engaging plate 14 with the pivoting mechanism 15, e.g., as is illustrated by FIG. 5. The stopper member 16 is attached to the litter engaging plate 14.

Figure 3:
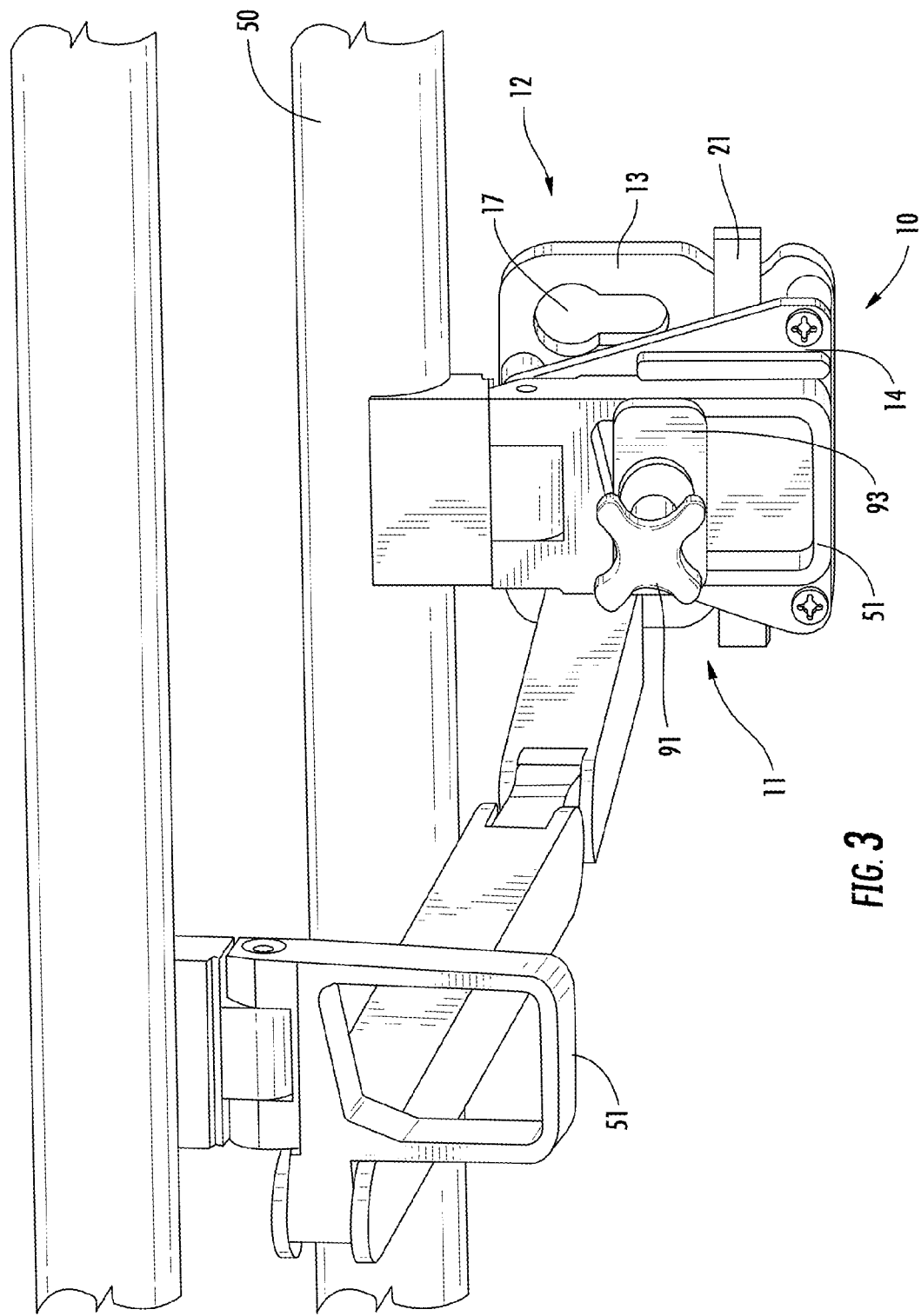
FIG. 3 is a back perspective view of the mounting device releasably attached to the litter according to an embodiment of the present invention.
Figure 4:
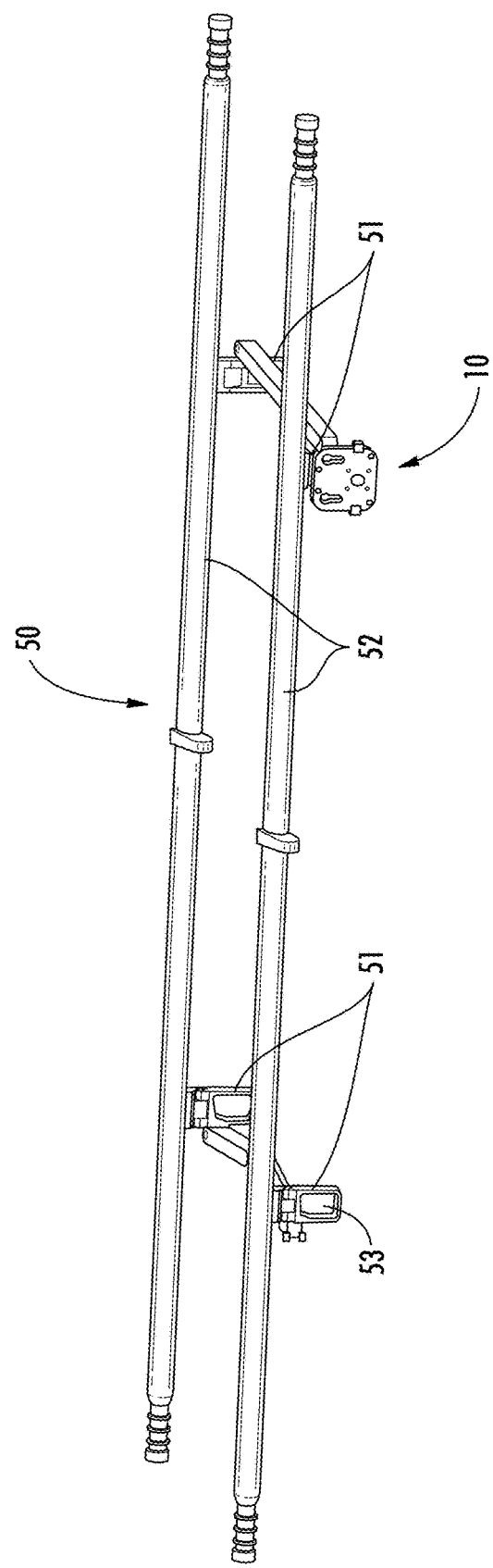
FIG. 4 is a front perspective view of the mounting device releasably attached to a litter according to an embodiment of the present invention.

Referring to FIGS. 2-4, the mounting device 10 is releasably attached to the litter 50. The litter 50 has a plurality of feet 51 attached to a pair of parallel poles 52. The plurality of feet 51 define apertures 53, wherein the mounting device 10 is releasably attachable to the foot of the litter 50 through one of the apertures 53. The mounting device 10 is releasably attached to the litter 50 by extending the fastening device 11 through the respective aperture 53. After the fastening device 11 is extended through the aperture 53, the device 10 or 11 (or a part thereof) is rotated in a radial direction such that the foot 51 prevents the fastening device 11 from disengaging the litter 50 by extending back through the aperture 53. For example and as shown by FIGS. 1 and 3, the fastening device 11 may comprise a hand screw 91 and a nut plate 93 (e.g., a T-bar clamp). When the hand screw 91 is rotated in a first direction, screw threading (not shown) causes the nut plate 93 to translate about the hand screw 91 towards an engaging plate 14 of the mounting device 10 and when turn in a second direction, opposite to the first direction, to move away from the engaging plate 14. In the illustrated embodiment, the nut plate 93 is sized and shaped such that it may pass through the aperture 53 when orientated in a first orientation and when orientated in a second orientation, e.g., perpendicular to the first orientation, to cause an interference fit with the respective foot 51 when translated towards the engaging plate 14 in the first direction, thereby releasably attaching the mounting device 10 to the litter 50 as illustrated by FIG. 3.

In another embodiment, engagement of the fastening device 11 causes the mounting structure 12 to translate in a lateral direction toward the foot 51 of the litter 50. The mounting structure 12 translates in a lateral direction until the litter engaging plate 14 engages the foot 51 of the litter 50. In all of the above embodiments, the litter engaging plate 14 engages the foot 51 of the litter 50 in a stable configuration, such that the mounting device 10 is securely attached releasably to the litter 50.

The fastening device 11 may comprise a clamping device, including but not limited to cam clamps, bar clamps, C-clamps, F-clamps, and T-bar clamps. It is understood by one skilled in the art that the fastening device 11 of the present invention should not be limited to the clamping devices disclosed herein, but may include any device capable of releasably attaching the mounting device 10 to the litter 50, such as for example, a simple wing nut and screw arrangement, a quick release clamp or skewer, and the likes.

Referring to FIGS. 1, 5, 6 and 7, the tilt plate 13 provides an interface wherein emergency equipment (discussed below) may be attached thereto. In one particular embodiment, the tilt plate 13 is substantially planar and defines a plurality of apertures 17. In a further embodiment, the plurality of apertures 17 comprise a substantially keyhole shape, such that an adapter may slidably engage the apertures 17 of the tilt plate 13.

The tilt plate 13 and the litter engaging plate 14 are attached to the pivoting mechanism 15, such that the tilt plate 13 may pivot about its attachment to the litter engaging plate 14 with the pivoting mechanism 15. In one embodiment, the tilt plate 13 may pivot about its attachment to the litter engaging plate 14 with a pivoting mechanism 15 in a continuous motion, such that the angle $\theta$ is variable. In this particular embodiment, the tilt plate 13 may pivot to any angle $\theta$ ranging from about 0° to about 90°. In an alternative embodiment, the tilt plate 13 may pivot about its attachment to the litter engaging plate 14 to a variety of fixed angles $\theta$. In this particular embodiment, the fixed angle $\theta$ may comprise any angle $\theta$ ranging from about 0° to about 90°. When the angle $\theta$ is about 0°, the tilt plate 13 engages the stopper member 16.

The pivoting mechanism 15 may operate such that the tilt plate 13 is held in a fixed position without the application of secondary mechanical support. Alternatively, the pivoting mechanism 15 may operate such that the tilt plate 13 is held in a fixed position with the application of secondary mechanical support.

In one embodiment, as shown in FIG. 5, the pivoting mechanism 15 may include a hinging mechanism. The hinging mechanism may include but should not be limited to friction hinges, adjustable friction hinges, and lever lock hinges. However, the pivoting mechanism should not be limited to the pivoting hinges disclosed herein, but may comprise any pivoting mechanism wherein the tilt plate 13 may pivot about its attachment to the litter engaging plate 14. For example, the pivoting mechanism 15 may comprise pivoting joints, such as U-joints.

Alternatively, the pivoting mechanism 15 may comprise a ratcheting mechanism comprising an extendable lever with a plurality of holes and a locking pin. In this particular embodiment, the tilt plate 13 may pivot about its attachment to the litter engaging plate 14 to a variety of fixed positions. Alternatively, the pivoting mechanism 15 may comprise a framing system wherein the tilt plate 13 is attached thereto, such that the tilt plate 13 may pivot about its attachment to the framing system. It is understood by one skilled in the art that the pivoting mechanism 15 of the present invention should not be limited to the mechanisms disclosed herein, but may include any pivoting mechanism 15 which allows the tilt plate 13 to pivot about its attachment to the litter engaging plate 14.

Figure 6:
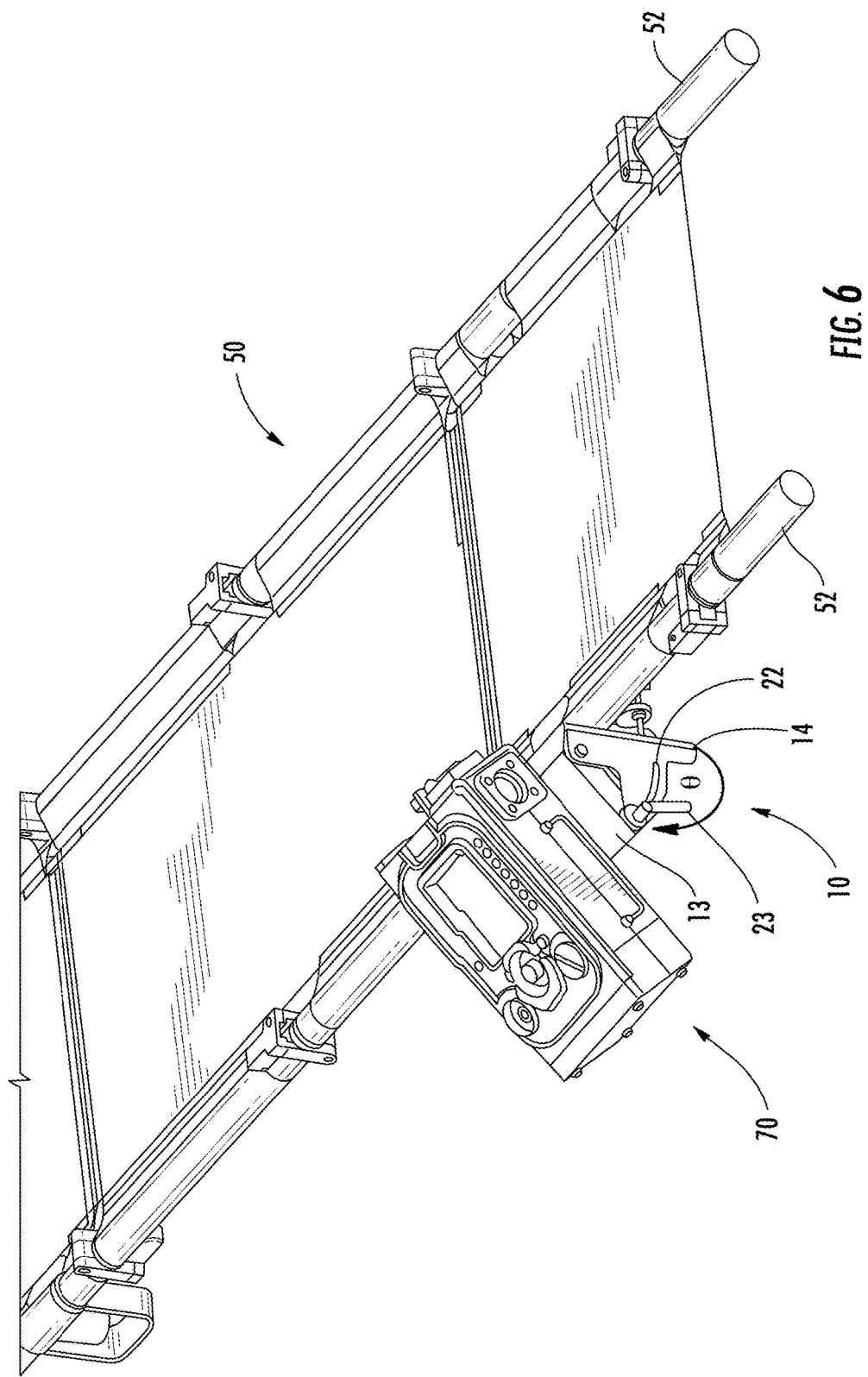
FIG. 6 is a front perspective view of the mounting device releasably attached to the litter according to an embodiment of the present invention.
Figure 7:
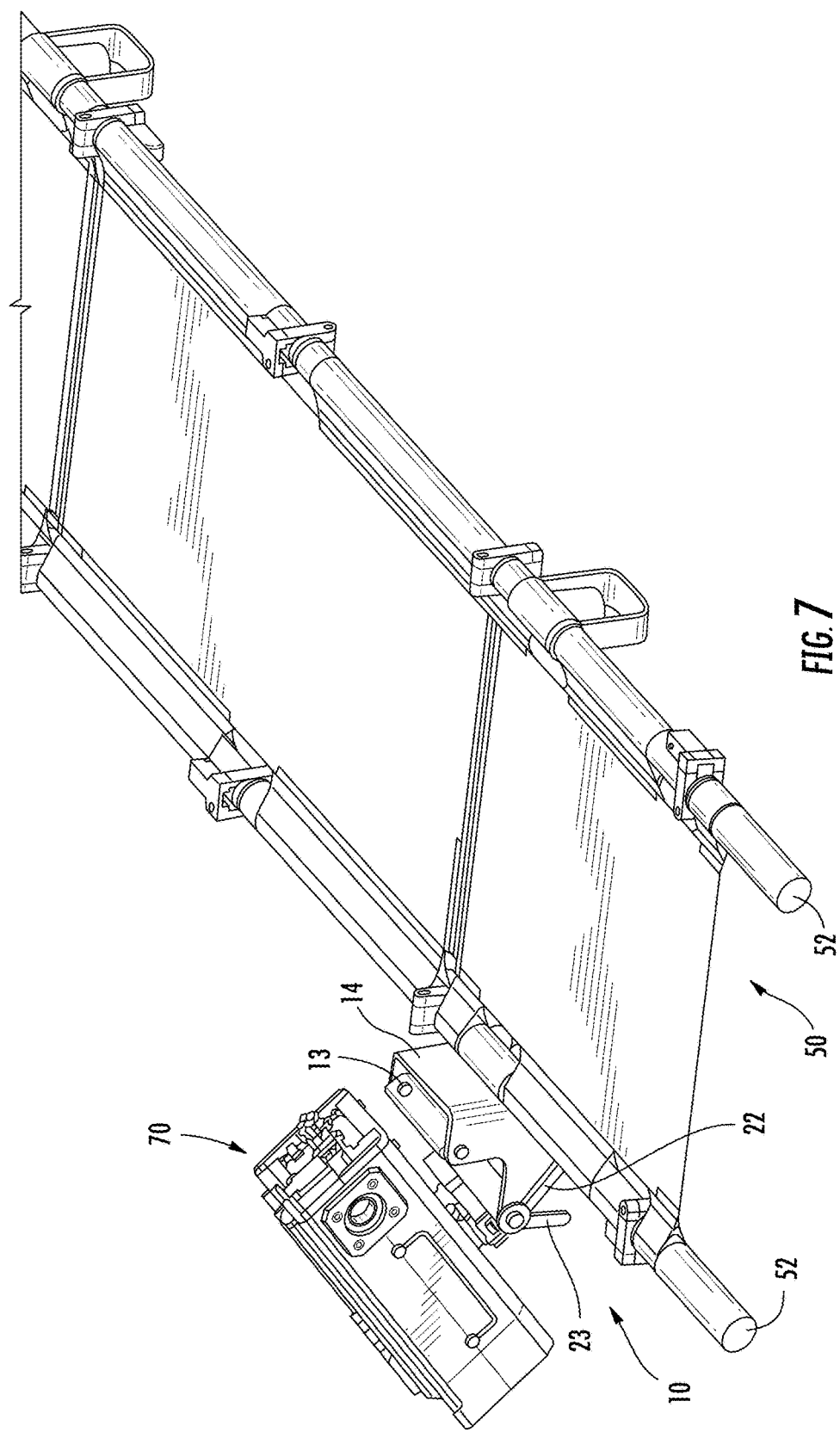
FIG. 7 is a side perspective view of the mounting device releasably attached to the litter according to an embodiment of the present invention.

In another embodiment, as depicted in FIGS. 6 and 7, the pivoting mechanism 15 may comprise a pair of engaging channels 22 through which the tilt plate 13 extends. In this particular embodiment, the tilt plate 13 is attached to the litter engaging plate 14 with suitable attachment devices including but not limited to nails, screws, nuts, and or bolts. Thus, the tilt plate may pivot about its attachment to the litter engaging plate 14 by translating through the engaging channels 22 to a variety of angles θ. The tilt plate 13 is also attached to a fixing device 23 for fixing the tilt plate 13 to a particular angle θ.

In one particular embodiment, the fixing device 23 fixes the tilt plate 13 to a particular angle θ by rotating the fixing device 23 such that it engages the tilt plate 13 in a secure configuration. For example, the fixing device 23 may comprise a T-handle bolt or a wing-nut. The fixing device 23 should not be limited to the devices disclosed herein, however, but may comprise any device which fixes the tilt plate 13 to a particular angle θ.

Referring to FIGS. 1 and 5, in one embodiment, the mounting structure 12 comprises a locking mechanism which secures the adapter and emergency equipment attached thereto (discussed below) to the mounting device 10. In an exemplary embodiment, the locking mechanism is a spring bias catch mechanism 18. In a further embodiment, the spring bias catch mechanism 18 is disposed within the tilt plate 13.

The spring bias catch mechanism 18 comprises a spring 19 operably attached to an engaging member 20. When the engaging member 20 is engaged, the engaging member 20 retracts into the tilt plate 13, causing the spring 19 to compress. When the engaging member 20 is disengaged, the spring 19 decompresses causing the engaging member 20 to extend to its original position. Thus, the spring bias catch mechanism 18 may secure the attachment of the emergency equipment to the mounting device 10 when the emergency equipment possesses a catch (discussed below) wherein the engaging member 20 may extend. It is understood by one skilled in the art that the locking mechanism of the present invention should not be limited to a spring bias catch mechanism 18, but may include any locking mechanism which secures the attachment of the emergency equipment to the mounting device 10.

In one embodiment, the spring bias catch mechanism 18 may comprise a release mechanism 21. In this particular embodiment, the release mechanism 21 is operably connected to the spring bias catch mechanism 18, such that when the release mechanism 21 is engaged, the emergency equipment is released from its secure attachment to the mounting device 10. When engaged, the release mechanism 21 engages the spring 19, causing the spring 19 to compress. When the spring 19 compresses, the engaging member 20 operably attached thereto, retracts into the tilt plate 13, releasing the adapter with emergency equipment attached thereto.

The tilt plate 13 provides an interface wherein emergency equipment may be attached thereto. In one particular embodiment, the tilt plate 13 is substantially planar and defines a plurality of apertures 17. In a further embodiment, the plurality of apertures 17 comprise a substantially keyhole shape, such that an adapter may slidably engage the apertures 17 of the tilt plate 13.

As depicted in FIGS. 8, 10, 12, and 14 the adapter 30 is capable of securely mating with the mounting device 10. In one embodiment, the adapter 30 comprises a standard mounting surface 31 and an equipment engaging surface 32. The standard mounting surface 31 is engageable to the tilt plate 13 of the mounting device 10. The equipment engaging surface 32 is engageable to the emergency equipment 70. Additionally, the adapter 30 may further define a catch 33 through which the engaging member 20 of the spring bias catch mechanism 18 may extend, securing the attachment of the emergency equipment to the mounting device 10.

The standard mounting surface 31 of the adapter 30 comprises a plurality of interlocking members 34 which may securely mate with the apertures 17 of the tilt plate 13. In this particular embodiment, the interlocking members 34 securely mate with the apertures 17 of the tilt plate 13 by slidably engaging the apertures 17 of the tilt plate 13. The interlocking members 34 slidably engage the apertures 17 of the tilt plate 13 by extending through the apertures 17 and translating in a substantially vertical direction through the apertures 17. In this particular embodiment, the adapter 30 securely mates with the mounting device 10 such that it is securely attached to the mounting device 10. Additionally, in this particular embodiment, the adapter 30 may be securely mated with the mounting device 10 and may be easily released therefrom. In an exemplary embodiment, the interlocking members 34 are substantially circular in shape. However, the shape of the interlocking members 34 should not be limited to substantially circular but may comprise any shape wherein the interlocking members 34 may extend through the apertures 17 of the tilt plate 13 and translate in a vertical direction through the apertures 17.

The equipment engaging surface 32 of the adapter comprises a plurality of engaging members 35 which may securely engage the emergency equipment. In one particular embodiment, the engaging members 35 may complimentarily engage the emergency equipment. The equipment engaging surface 32 and engaging members 35 are adaptable to fit a variety of emergency equipment.

Figure 8:
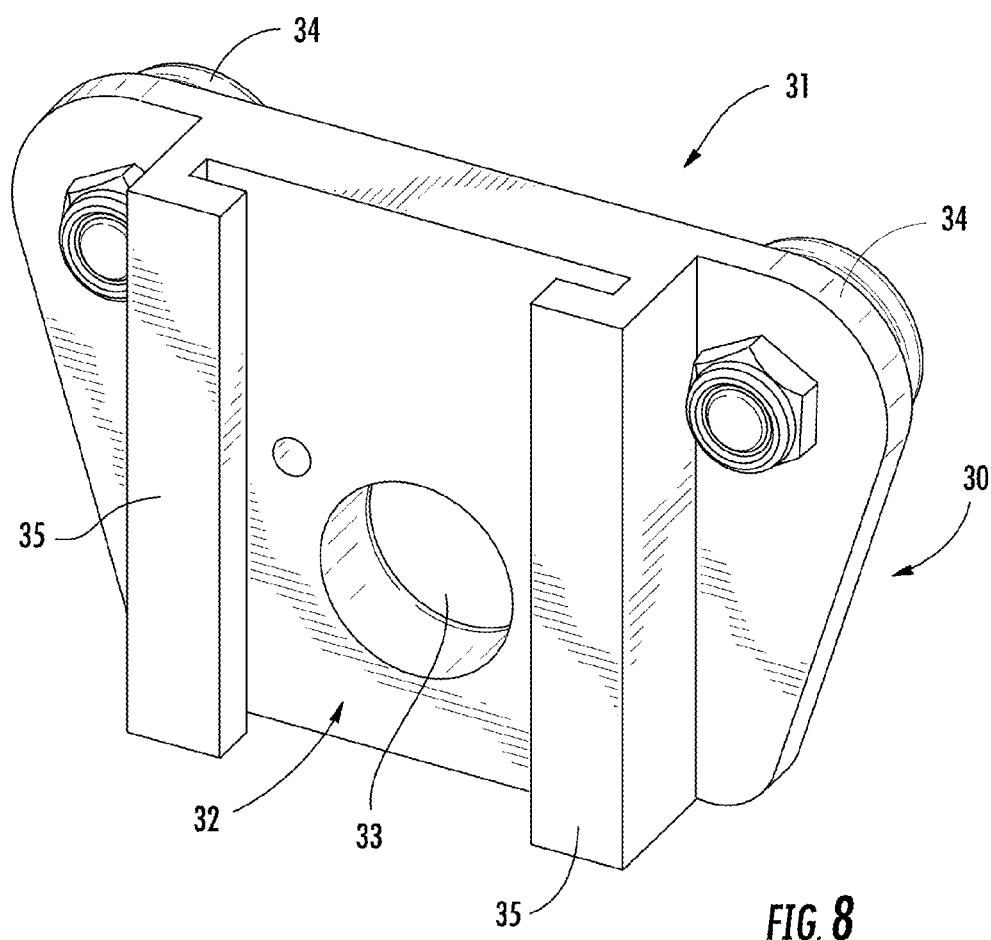
FIG. 8 is a front perspective view of an adapter capable of securely mating with the mounting device according to an embodiment of the present invention.
Figure 9:
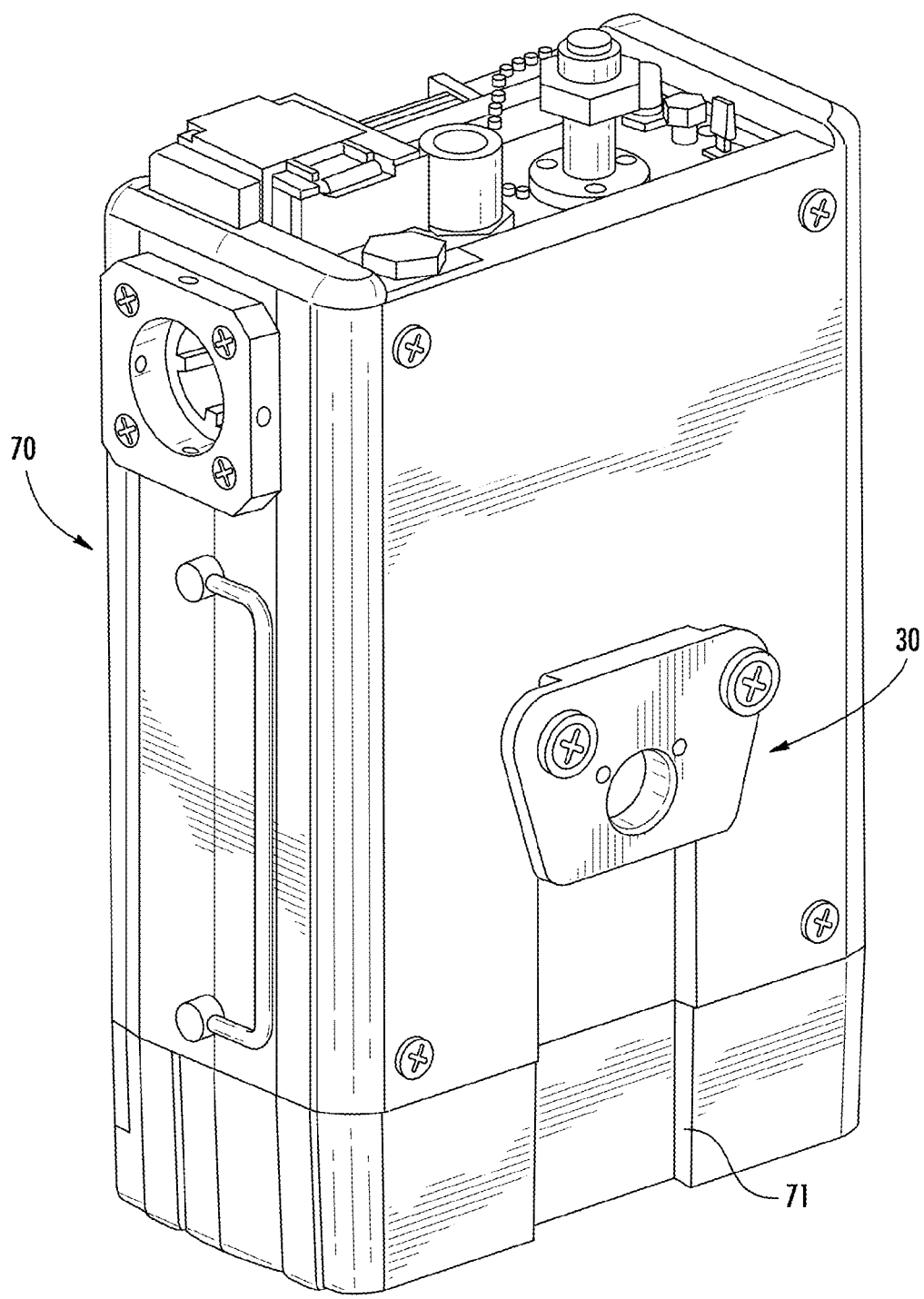
FIG. 9 is a back perspective view of emergency equipment releasably attached to the adapter depicted in FIG. 8 according to an embodiment of the present invention.
Figure 10:
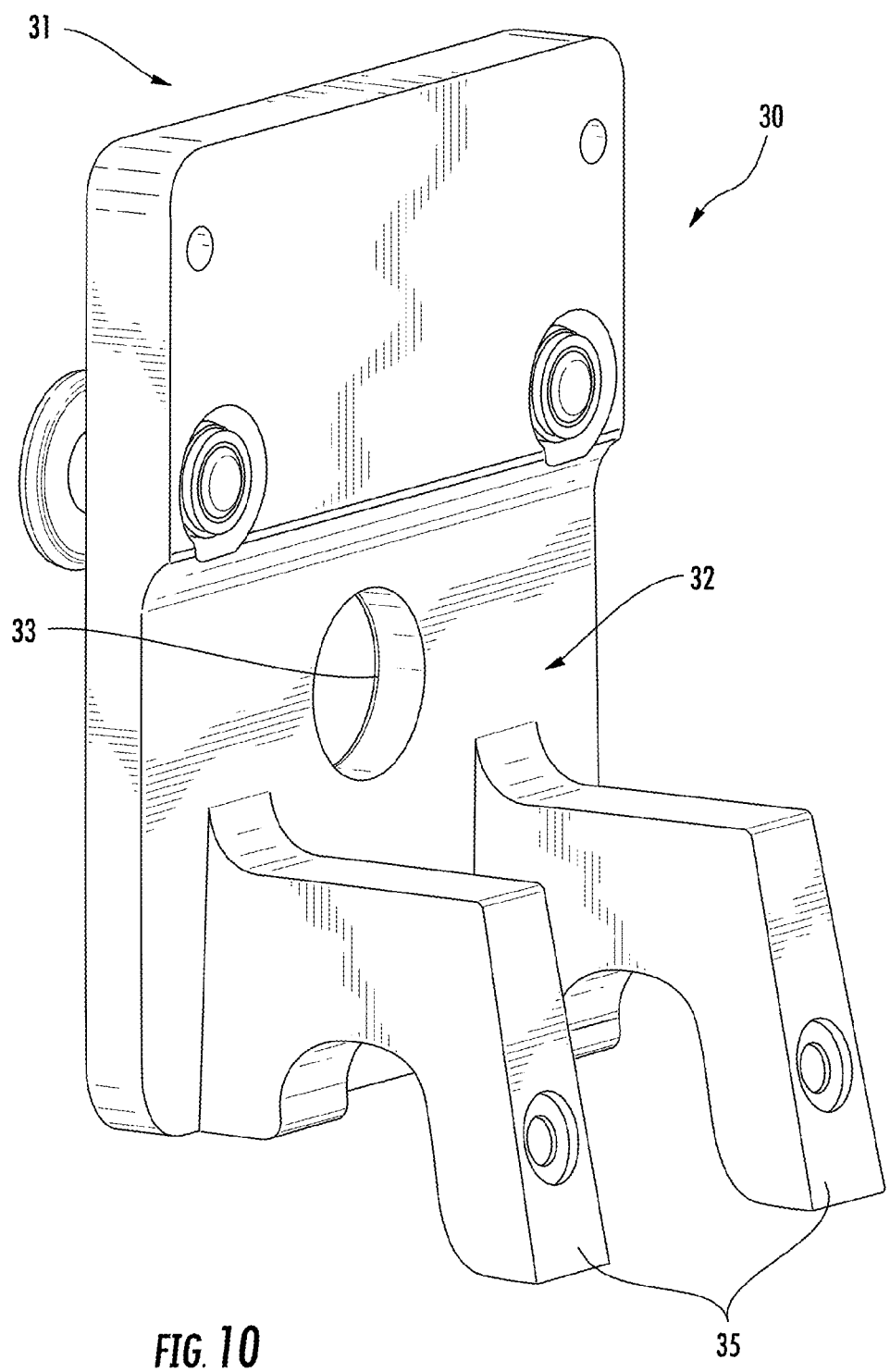
FIG. 10 is a back perspective view of an adapter capable of securely mating with the mounting device according to an embodiment of the present invention.
Figure 11:
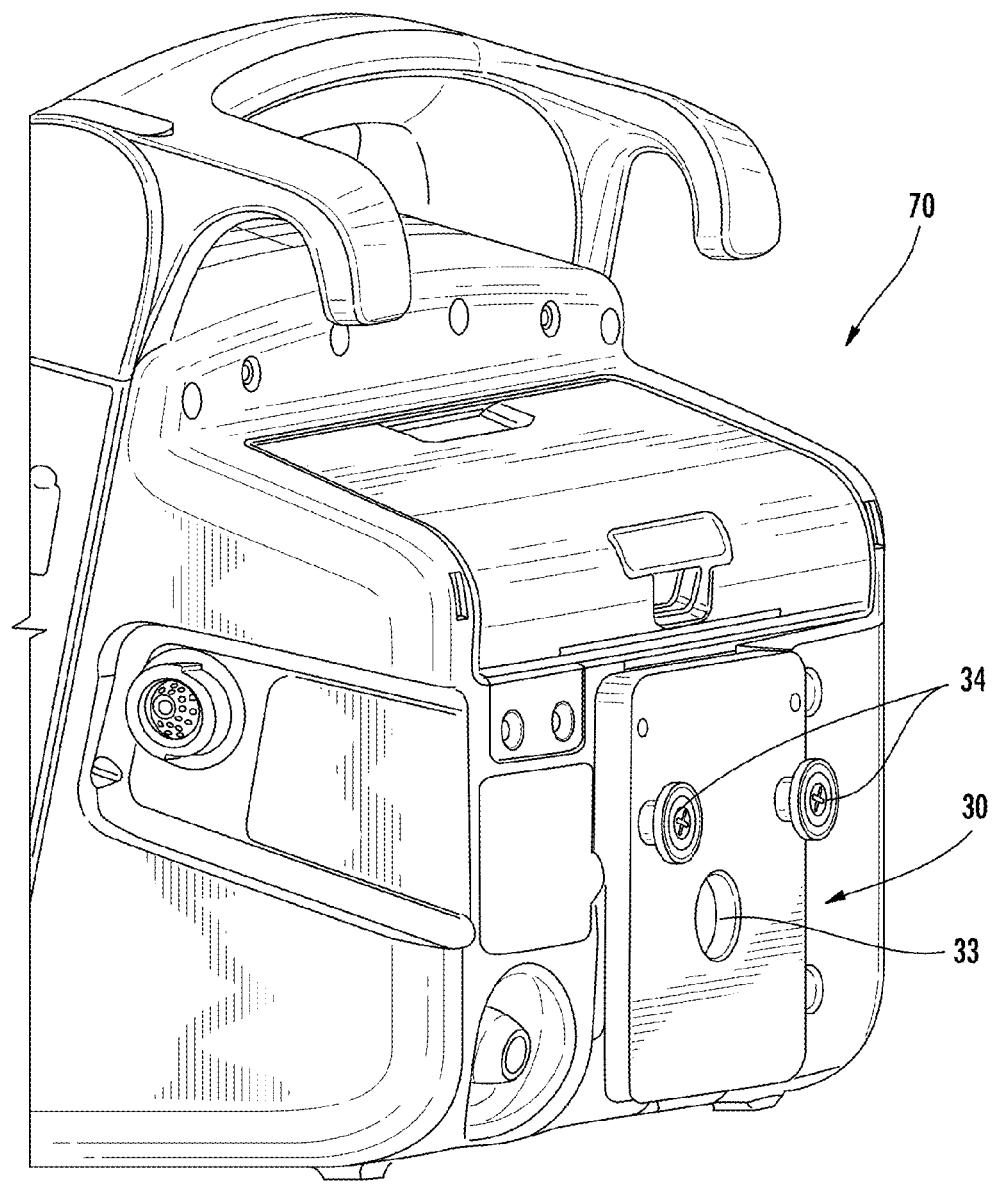
FIG. 11 is a back perspective view of emergency equipment releasably attached to the adapter depicted in FIG. 10 according to an embodiment of the present invention.
Figure 12:
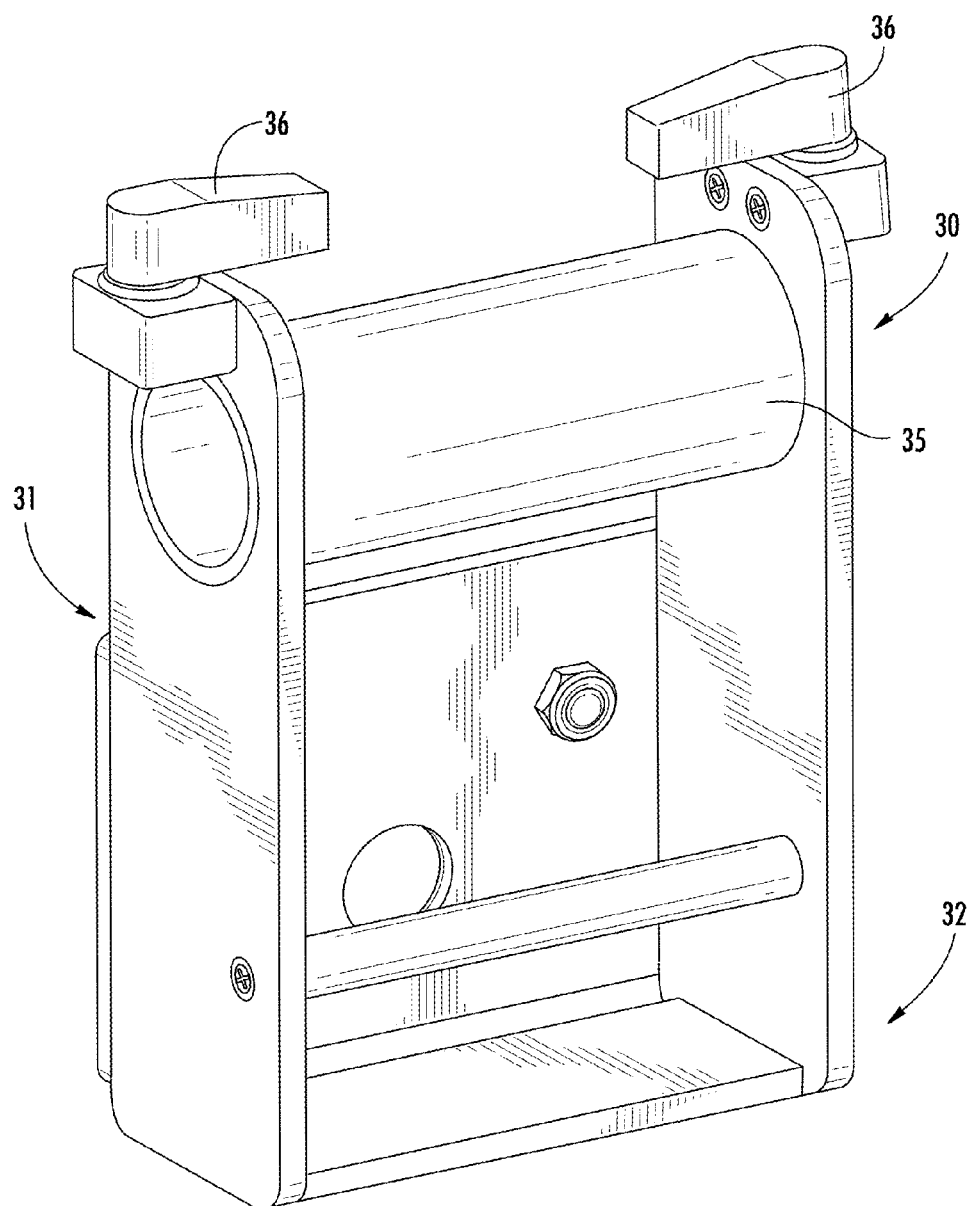
FIG. 12 is a back perspective view of an adapter capable of securely mating with the mounting device according to an embodiment of the present invention.
Figure 13:
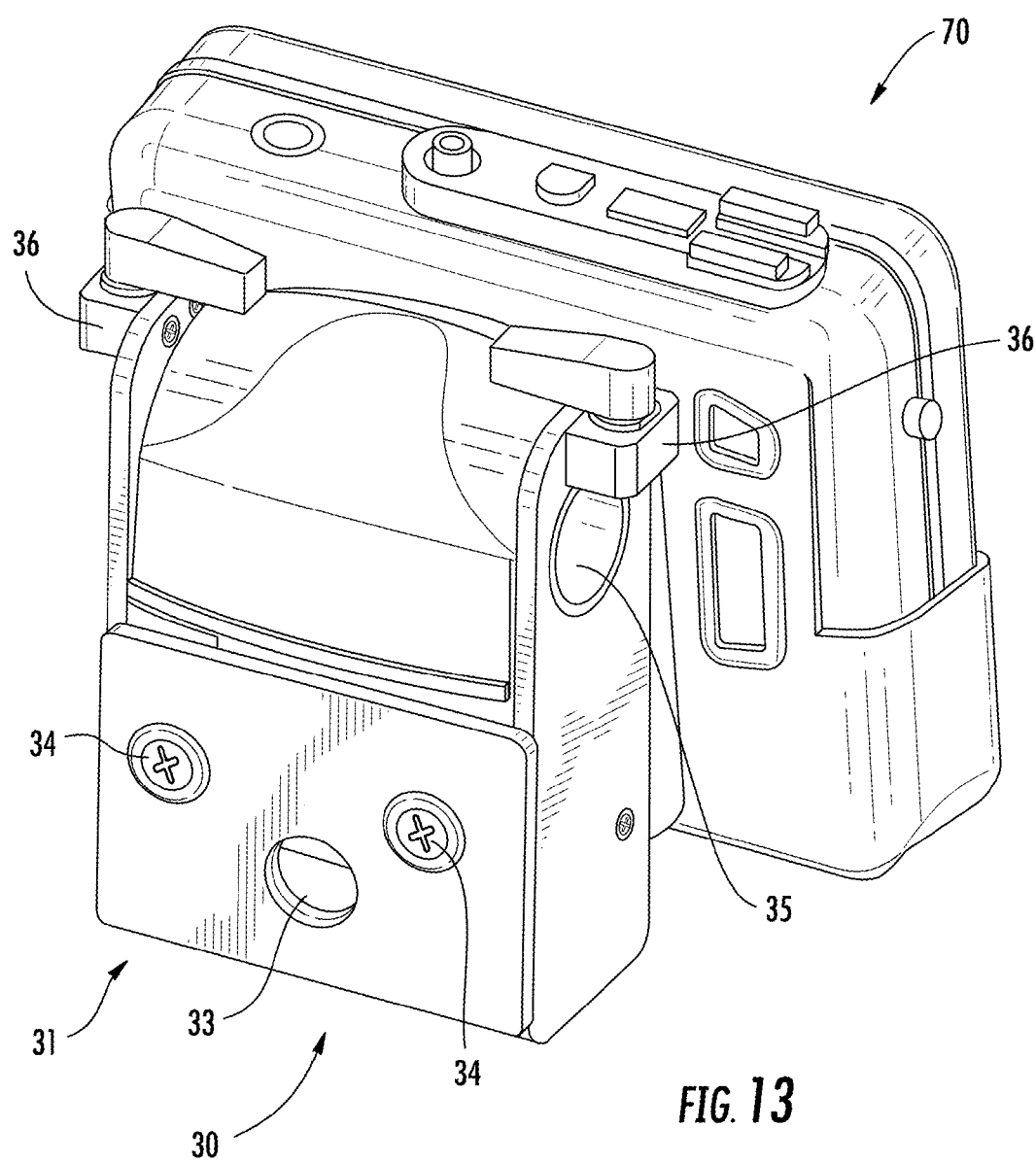
FIG. 13 is a back perspective view of emergency equipment releasably attached to the adapter depicted in FIG. 12 according to an embodiment of the present invention.

As depicted in FIGS. 8 and 9, in one particular embodiment, the engaging members 35 may comprise a plurality of vertical members. In this particular embodiment, the plurality of vertical members may slidably engage the emergency equipment. Alternatively, as depicted in FIGS. 10 and 11, the engaging members 35 may comprise a plurality of angular members. The angular members complimentarily engage the emergency equipment by securely mating with the emergency equipment 70. In yet another embodiment, as depicted in FIGS. 12 and 13, the engaging members 35 may comprise a removable member. In this particular embodiment, the removable member may comprise a substantially cylindrical member which may be inserted within the emergency equipment 70 and then reattached to the adapter 30 with attachment devices 36.

Figure 14:
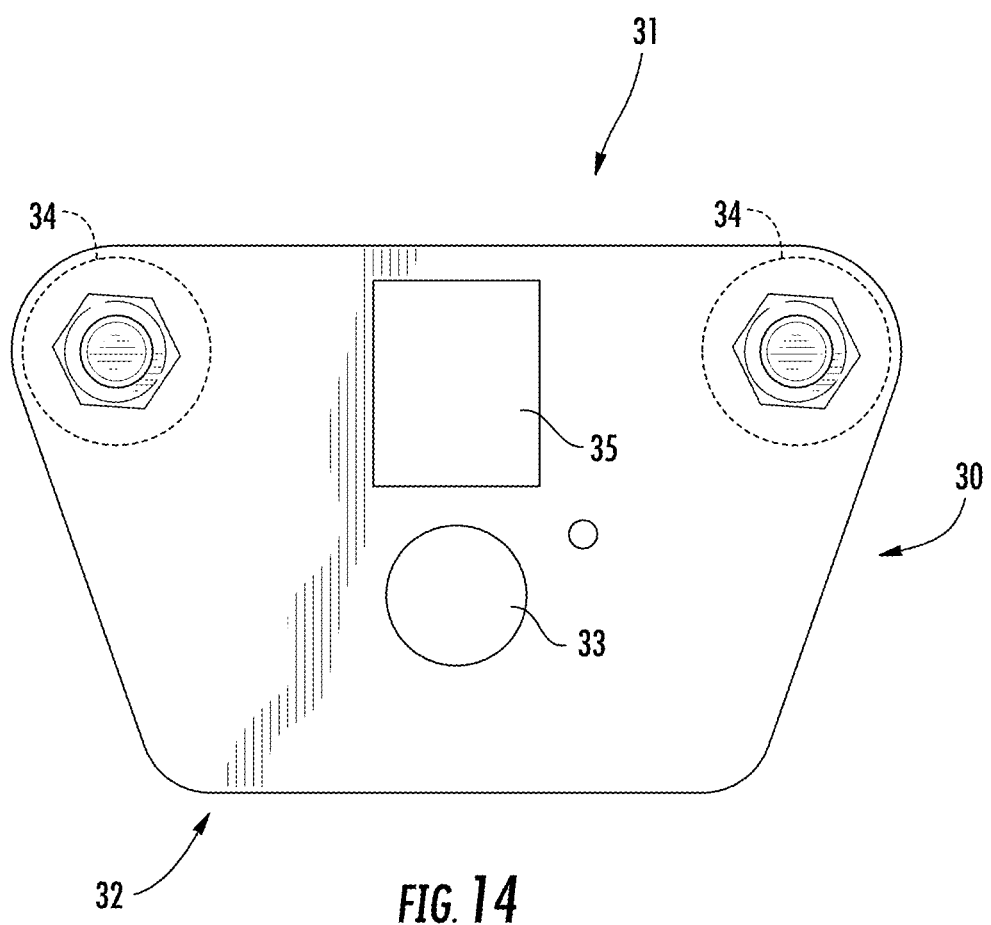
FIG. 14 is a back view of an adapter capable of securely mating with the mounting device according to an embodiment of the present invention.

As depicted in FIG. 14, in one particular embodiment, the equipment engaging surface 32 and engaging members 35 are adaptable to accommodate an IV pole. In this particular embodiment, the engaging member 35 may comprise a wedge wherein the IV pole may be accommodated. In a further embodiment, the wedge may comprise a substantially cylindrical structure with a top opening wherein the IV pole may be accommodated. In this particular embodiment, the wedge may accommodate the Ferno 2030 IV Pole. The wedge may be configured onto the equipment engaging surface 32 such that when the IV pole is accommodated by the wedge, the IV pole is substantially vertical.

In each embodiment, the engaging members 35 complimentarily engage the emergency equipment 70 such that the emergency equipment 70 is securely attached to the adapter 30. The emergency equipment may comprise any device that is critical to patient care or that is capable of monitoring a patient. The engaging members 35 should not, however, be limited to the specific embodiments disclosed herein. The engaging members 35 may comprise any shape or form by which the emergency equipment 70 may be attached to the adapter 30. In one particular embodiment, the engaging members 35 may comprise any shape or form capable of complimentarily engaging the emergency equipment 70.

Figure 15:
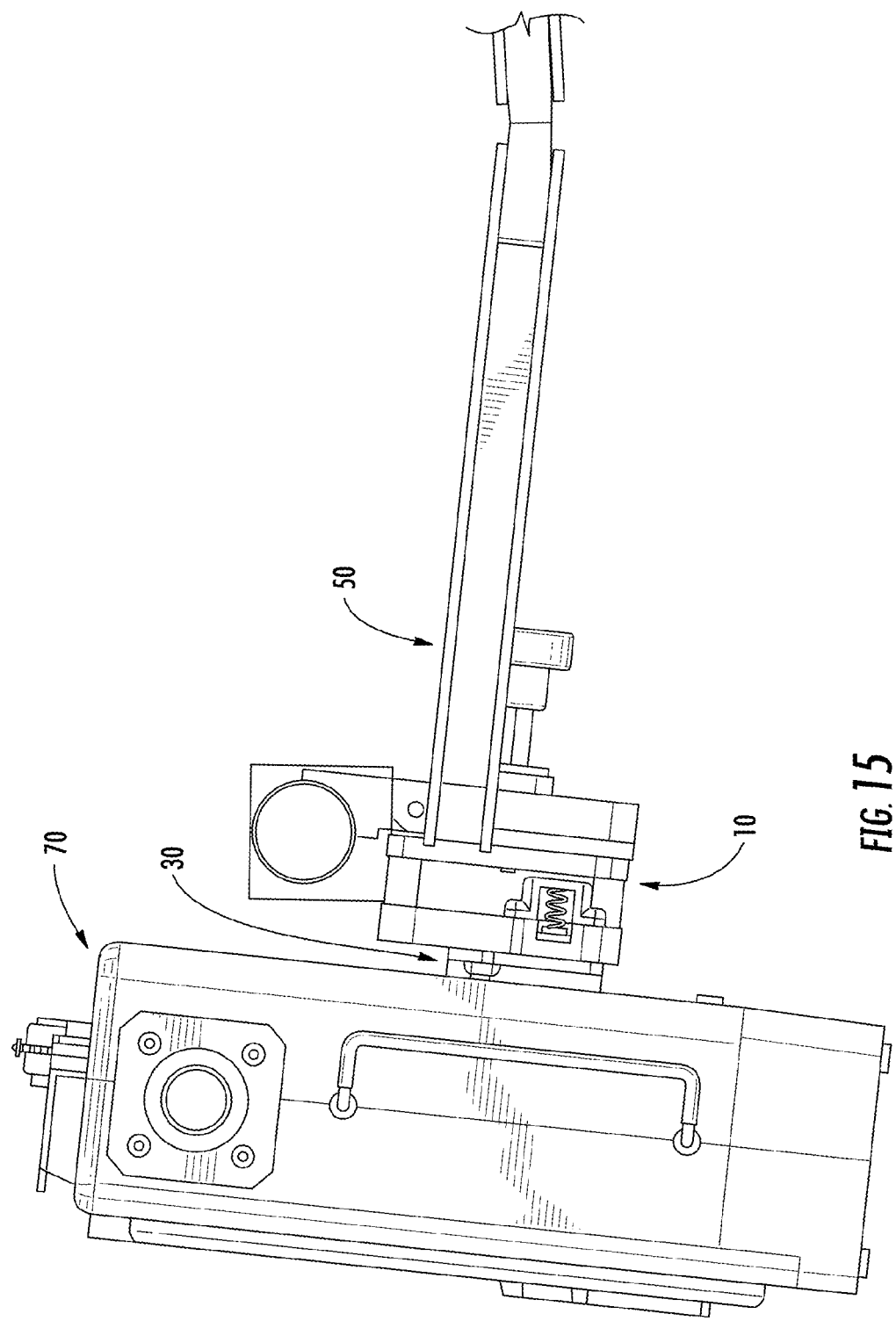
FIG. 15 is a side view of the emergency equipment releasably attached to the adapter depicted in FIG. 9, wherein the adapter is securely mated with the mounting device according to an embodiment of the present invention.
Figure 16:
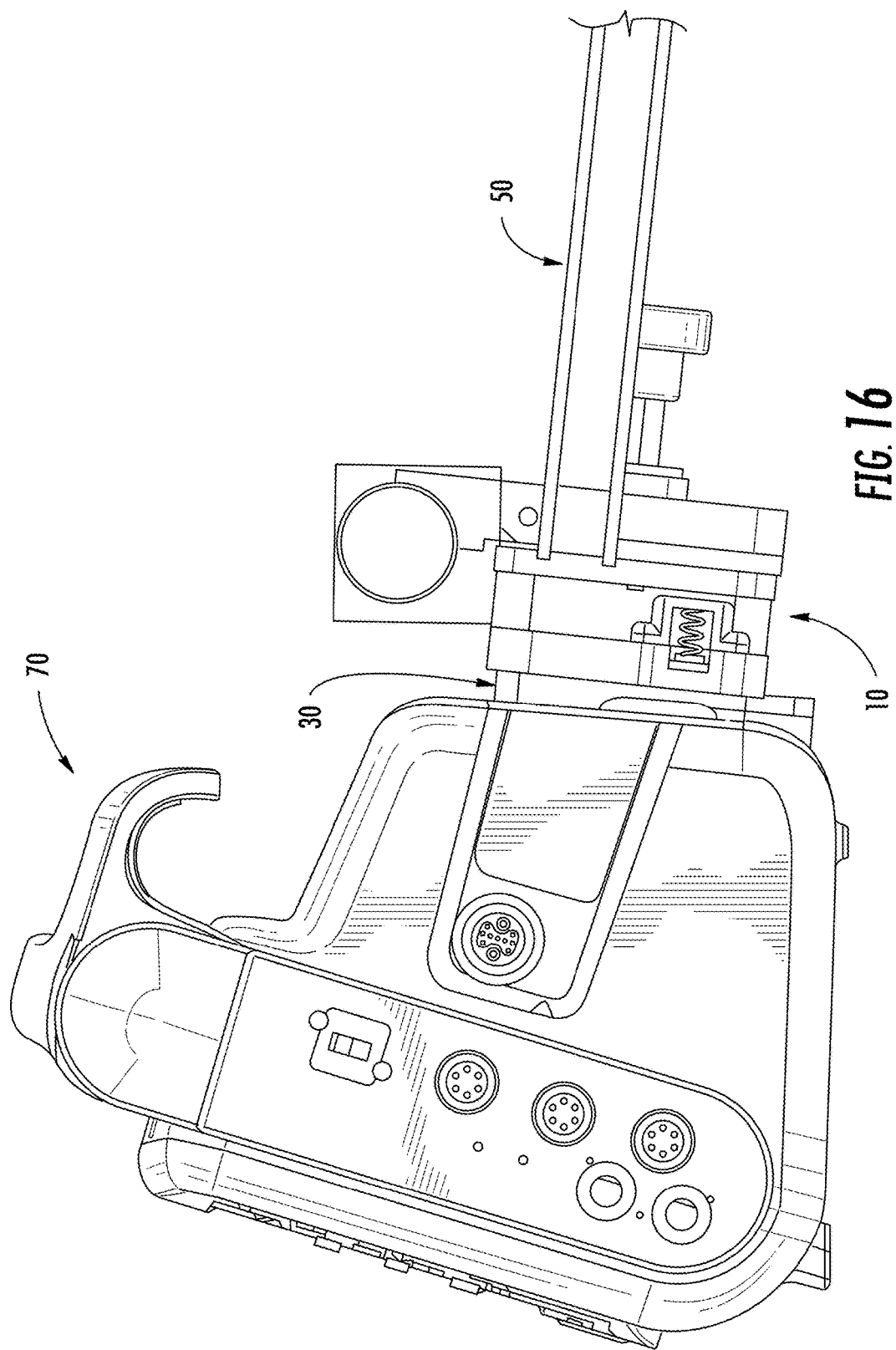
FIG. 16 is a side view of the emergency equipment releasably attached to the adapter depicted in FIG. 11, wherein the adapter is securely mated with the mounting device according to an embodiment of the present invention.

FIGS. 15, 16, and 17 depict the emergency equipment 70 attached to the adapter 30 which is attached to the mounting device 10. More particularly, the emergency equipment 70 is complimentarily engaged with the engaging members 35 of the adapter 30, the interlocking members 34 of the adapter 30 are securely mated with the tilt plate 13 of the mounting device 10, and the mounting device 10 is releasably attached to the litter 50. The emergency equipment 70 attached to the adapter 30 may pivot with the tilt plate 13 about its attachment to the litter engaging plate 14 with the pivoting mechanism 15. The emergency equipment 70 attached to the adapter 30 may pivot up or down in a substantially vertical direction. Thus, the emergency equipment 70 attached to the adapter 30 may pivot to prevent contact with objects such as tabletops or the ground.

In still another embodiment, a method for utilizing the mounting device 10 according to the present invention is also disclosed. For example, to attach releasably emergency equipment 70 to a foot 51 of a litter 50, the mounting device 10 is attached releasably via passing the fastening device 11 through an aperture 53 of the foot 51 of the litter 50 in a first orientation, and then placing the fastening device 11 in a second orientation. Next, the fastening device 11 is tightened such that the clamps the foot 51 between the fastening device 11 and the litter engaging plate 14 to releasably attach the mounting device to the litter 50. Next, an adapter which on a first side is mounted to the emergency equipment is releasably engaged on a second side to the tilt plate 13 via the spring bias catch mechanism 18. It is to be appreciated that the tilt plate 13 provides a pivotal interface for the attachment of the emergency equipment 70 thereto such that when attached to the tilt plate 13, the emergency equipment 70 may pivot with the tilt plate 13 about the attachment of the tilt plate 13 to the litter engaging plate 14.

For the purposes of describing and defining the present invention it is noted that the terms "about" and "substantially" are utilized herein to represent the inherent degree of uncertainty that may be attributed to any quantitative comparison, value, measurement, or other representation. The terms "about" and "substantially" are also utilized herein to represent the degree by which a quantitative representation may vary from a stated reference without resulting in a change in the basic function of the subject matter at issue.

The above description and drawings are only to be considered illustrative of exemplary embodiments, which achieve the features and advantages of the present invention. Modification and substitutions the features and steps described can be made without departing from the intent and scope of the present invention. Accordingly, the invention is not to be considered as being limited by the foregoing description and drawings, but is only limited by the scope of the appended claims.

What is claimed is:

1. A mounting device providing a pivotal interface for attachment of emergency equipment to a rescue transport, the mounting device comprising:
   a fastening device releasably attachable to the rescue transport; and
   a mounting structure attached to the fastening device, wherein the mounting structure comprises:
      an engaging plate; and
      a tilt plate pivotally attached to the engaging plate with a pivoting mechanism, wherein the tilt plate comprises a spring-bias catch mechanism disposed therein for securing the emergency equipment to the mounting device, and wherein the tilt plate provides the pivotal interface for attachment of the emergency equipment thereto such that when attached to the tilt plate, the emergency equipment may pivot with the tilt plate about the attachment of the tilt plate to the engaging plate
   wherein the spring-bias catch mechanism comprises a spring operably attached to an engaging member, such that:
      when the engaging member is engaged, the engaging member retracts into the tilt plate in a retracted position and compresses the spring, and
      when the engaging member is disengaged, the spring decompresses and extends the engaging member from the retracted position to an extended position, wherein the extended position secures the attachment of the emergency equipment to the tilt plate.

2. The mounting device of claim 1, wherein the fastening device comprises a clamping device.

3. The mounting device of claim 1, wherein the pivoting mechanism comprises a hinging mechanism.

4. The mounting device of claim 1, wherein the pivoting mechanism comprises a ratcheting mechanism.

5. The mounting device of claim 1, wherein the pivoting mechanism comprises a pair of engaging channels defined by the engaging plate through which the tilt plate may translate.

6. The mounting device of claim 5, further comprising a fixing device attached to the tilt plate.

7. The mounting device of claim 1, wherein the rescue transport is selected from the group consisting of a litter, a cot, and an emergency vehicle.

8. The mounting device of claim 1, wherein the rescue transport is a cot.

9. A mounting device providing a pivotal interface for attachment of emergency equipment to a rescue transport, the mounting device comprising:
   a fastening device releasably attachable to the rescue transport; and
   a mounting structure attached to the fastening device, wherein the mounting structure comprises:
      an engaging plate; and
   a tilt plate pivotally attached to the engaging plate with a pivoting mechanism, wherein the tilt plate comprises a spring-bias catch mechanism disposed therein for securing the emergency equipment to the mounting device, and wherein the tilt plate provides the pivotal interface for attachment of the emergency equipment thereto such that when attached to the tilt plate, the emergency equipment may pivot with the tilt plate about the attachment of the tilt plate to the engaging
      wherein the spring-bias catch mechanism comprises:
         an engaging member;
         a spring operably attached to the engaging member; and
         a release mechanism operably connected to the spring, such that:
            when the engaging member is engaged, the engaging member retracts into the tilt plate in a retracted position and compresses the spring,
            when the engaging member is disengaged, the spring decompresses and extends the engaging member from the retracted position to an extended position, wherein the extended position secures the attachment of the emergency equipment to the tilt plate, and when the release mechanism is engaged, the release mechanism engages the spring, compressing the spring and retracting the engaging member into the retracted position, wherein the retracted position releases the secure attachment of the emergency equipment to the tilt plate.

10. The mounting device of claim 1, further comprising an adapter releasably engageable with the tilt plate and with the emergency equipment, wherein the emergency equipment may pivot with the tilt plate and the adapter about the attachment of the tilt plate to the engaging plate.

11. The mounting device of claim 10, wherein the adapter comprises a mounting surface for releasably engaging the tilt plate and an equipment engaging surface for releasably engaging the emergency equipment.

12. The mounting device of claim 10, wherein:
the tilt plate defines a plurality of apertures; and
the adapter comprises a plurality of interlocking members for securely mating with the plurality of apertures defined by the tilt plate.

13. The mounting device of claim 10, wherein:
the tilt plate defines a plurality of apertures;
the adapter comprises a plurality of interlocking members for securely mating with the plurality of apertures defined by the tilt plate; and
the adapter comprises a plurality of engaging members for securely and releasably engaging the emergency equipment.

14. The mounting device of claim 10, wherein:
the tilt plate defines a plurality of apertures;
the adapter comprises a plurality of interlocking members for slidably engaging the plurality of apertures defined by the tilt plate; and
the adapter comprises an equipment engaging surface comprising a plurality of vertical members, angular members, or removable members for releasably engaging the emergency equipment.

15. The mounting device of claim 10, wherein the adapter comprises an equipment engaging surface with a wedge.

16. The mounting device of claim 9, further comprising an adapter releasably engageable with the tilt plate and with the emergency equipment, wherein the emergency equipment may pivot with the tilt plate and the adapter about the attachment of the tilt plate to the engaging plate.

17. The mounting device of claim 16, wherein the adapter comprises a mounting surface for releasably engaging the tilt plate and an equipment engaging surface for releasably engaging the emergency equipment.

18. The mounting device of claim 16, wherein:
the tilt plate defines a plurality of apertures; and
the adapter comprises a plurality of interlocking members for securely mating with the plurality of apertures defined by the tilt plate.

19. The mounting device of claim 16, wherein:
the tilt plate defines a plurality of apertures;
the adapter comprises a plurality of interlocking members for securely mating with the plurality of apertures defined by the tilt plate; and
the adapter comprises a plurality of engaging members for securely and releasably engaging the emergency equipment.

20. The mounting device of claim 16, wherein:
the tilt plate defines a plurality of apertures;
the adapter comprises a plurality of interlocking members for slidably engaging the plurality of apertures defined by the tilt plate; and
the adapter comprises an equipment engaging surface comprising a plurality of vertical members, angular members, or removable members for releasably engaging the emergency equipment.

\* \* \* \* \*

UNITED STATES PATENT AND TRADEMARK OFFICE
CERTIFICATE OF CORRECTION

PATENT NO. : 9,545,346 B2  
APPLICATION NO. : 14/156816  
DATED : January 17, 2017  
INVENTOR(S) : Robert C. Chinn et al.

Page 1 of 1

It is certified that error appears in the above-identified patent and that said Letters Patent is hereby corrected as shown below:

In the Claims

Column 8, Claim 9, Line 55:
"plate to the engaging"
Should read:
--plate to the engaging plate--.

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*